United States Patent [19]
Goodwin

[11] Patent Number: 6,080,300
[45] Date of Patent: Jun. 27, 2000

[54] ELECTROLYTIC PROCESS FOR GENERATION OF LOW-SULPHATE FERRIC HYDROXIDE SUSPENSIONS TO EFFECT PURIFICATION OF WASTEWATER

[76] Inventor: Ernest Goodwin, 2130 Van Horne Drive, Kamloops, B.C., V1S 1G2, Canada

[21] Appl. No.: 09/167,502

[22] Filed: Oct. 7, 1998

[51] Int. Cl.[7] .................................................. C02F 1/461
[52] U.S. Cl. .................... 205/751; 205/752; 205/756; 205/761; 205/509
[58] Field of Search ................................. 205/751, 752, 205/756, 761, 509

[56] References Cited

U.S. PATENT DOCUMENTS

| | | |
|---|---|---|
| 3,813,321 | 5/1974 | Bastacky . |
| 4,163,716 | 8/1979 | Turnbull .................................. 205/751 |
| 4,304,647 | 12/1981 | Lutz et al. . |
| 4,693,798 | 9/1987 | Gale et al. ................................ 205/761 |
| 5,385,653 | 1/1995 | Tamarkin ................................. 205/745 |
| 5,531,865 | 7/1996 | Cole . |
| 5,587,057 | 12/1996 | Metzler et al. . |
| 5,595,645 | 1/1997 | Barr . |
| 5,611,907 | 3/1997 | Herbst et al. . |
| 5,698,107 | 12/1997 | Wurzburger et al. . |

Primary Examiner—Arun S. Phasge

[57] ABSTRACT

The present invention is directed to a process for treating wastewater which comprises producing a ferric hydroxide suspension directly by electrolysis of the wastewater to precipitate heavy metals and organic or inorganic suspended solids thus purifying the wastewater. The purified wastewater, which is a saturated aqueous solution of calcium sulphate, can be recycled for further treatment and production of a low sulphate ferric hydroxide suspension. The process of the present invention is suitable for treatment of wastewaters obtained from mine tailings dams, metal mine pits, etc. and avoids the problems and difficulties of the known processes.

11 Claims, 3 Drawing Sheets

ELECTROLYTIC PROCESS FOR GENERATION OF LOW-SULPHATE FERRIC HYDROXIDE SUSPENSIONS TO EFFECT PURIFICATION OF WASTEWATER

The present invention is directed to the generation of low-sulphate ferric hydroxide suspensions that can be used in known wastewater purification processes.

Aqueous suspensions of ferric hydroxide have been used extensively to facilitate the removal of dissolved heavy metals and suspended solids from wastewaters for the purposes of purifying the wastewater. In known wastewater treatment processes an aqueous suspension of ferric hydroxide is added to a wastewater to be purified. The aqueous suspension of ferric hydroxide causes the heavy metals and suspended solids to be adsorbed so that they can be easily removed and disposed of. It may also be necessary to adjust the pH of the aqueous suspension depending on which particular group of heavy metals are to be removed.

Typically, the aqueous suspensions of the ferric hydroxide have been obtained from ferric sulphate process solutions obtained from waste-sulfuric acid pickling solutions of steel plants. There are disadvantages to obtaining the aqueous suspensions of the ferric hydroxide in this manner.

The ferric sulphate process solutions must be transported to the facilities where the wastewater is to be treated. They are corrosive and hence must be stored in stainless steel, fibreglass-reinforced polyester or rubber lined tanks. Any fittings, pipes or valves that come in contact with the ferric sulphate process solutions must also be made of similar corrosion resistant materials.

The ferric sulphate process solution and lime is added directly to the wastewater to be treated. An aqueous suspension of ferric hydroxide forms in the wastewater to be treated thus purifying the wastewater leaving a treated wastewater and a waste ferric hydroxide suspension sludge. The treated wastewater is still however a saturated solution of calcium sulphate that can sometimes present difficulties for disposal into the environment. The ferric hydroxide suspension sludge must also be disposed of. The ferric hydroxide suspension sludge contains heavy metals and organic and inorganic deposited solids.

Other difficulties arise with this process as well. For example, in order to prepare the aqueous suspension of the ferric hydroxide from the ferric sulphate process solutions considerable quantities of lime are required to neutralize the acid content before the aqueous suspension of the ferric hydroxide is produced. This lime addition far exceeds the amount of lime that would be needed to adjust the alkalinity of the wastewater.

This neutralization step of adding lime to the ferric sulphate process solution results in an excess of calcium sulphate sludge in the aqueous suspension of the ferric hydroxide which may result in scale formation. It can also be difficult to settle and clarify this mixture.

As mentioned above, although a purified wastewater is obtained it is still a saturated solution of calcium sulphate. This wastewater is still not acceptable for domestic use or for direct discharge into the environment. It is a hard water and aquatic life is particularly sensitive to hard water.

The above-described ferric sulphate treatment works well in areas where the wastewater to be treated is high in concentrations of heavy metals but limited in volume. In such circumstances, the resulting calcium sulphate sludge can be buried in waste pits and the treated wastewater recycled. Frequently, the calcium sulphate sludge mixed with waste ferric hydroxide sludge is deposited at the bottom of a tailings pond or disused mine pits that have been filled with water to slow down mineral oxidation. Eventually, however, the water covering the deposited material becomes saturated with calcium sulphate, for example, in an amount of up to 2000 mg/l $CaSO_4$.

It would be advantageous from an economic and environmental point of view to find some use for these and other saturated solutions of calcium sulphate. The present invention makes use of such saturated solutions of calcium sulphate to produce ferric hydroxide suspensions for wastewater treatment.

The present inventor has discovered that saturated solutions of calcium sulphate can be treated, as will be described in detail below, to generate a ferric hydroxide suspension that can then be used in typical wastewater treatment processes.

If the saturated solutions of calcium sulphate could be recycled up to 95% (i.e. if it were possible to remove up to 95% of the calcium sulphate from the resulting ferric hydroxide suspension water) this would ensure that only 5% of the original sulphate would be retained and carried over from the ferric hydroxide suspension to the wastewater being treated.

There would also be considerable advantage if the ferric hydroxide suspension was able to treat 20 times its suspension volume of wastewater.

Further disadvantages exist in the known processes. For example, wastewater treatment operations are often situated in remote areas with limited or difficult access, i.e. abandoned mine sites. There must be adequate storage facilities for the needed reagents to ensure that there is sufficient capacity to ride out any stoppage in supply of the necessary process reagents. In addition, it is desirable to reduce the requirements for transportation and processing of hazardous reagents and materials.

The process of the present invention reduces some of the disadvantages and limitations of the known prior art processes by substituting electrical power and fairly inert process cess materials for those used in the known prior art processes.

An object of the present invention is to provide an economically viable and environmentally sound wastewater treatment process.

A further object of the invention is to provide a process to recycle a saturated solution of calcium sulphate in clean water resulting from the initial wastewater treatment or from other sources so that only 5% of the original sulphate is retained in the ferric hydroxide suspension.

The term "clean water" as used herein refers to the treated wastewater devoid of heavy metal contaminants or suspended solids or other saturated solutions of calcium sulphate.

The present invention is directed to a process for treating wastewater which comprises producing a ferric hydroxide suspension directly by electrolysis of the wastewater which is a saturated solution of calcium sulphate, gypsum, plaster of Paris or other low solubility forms of calcium. The electrolysis is conducted between mild steel electrodes. The quantity of hydroxide suspension produced depends only on the period of electrolysis and the magnitude of the electrical current.

In detail, a wastewater comprising a saturated solution of calcium sulphate or a saturated solution of calcium sulphate in clean water recycled from the process described herein enters an electrolysis and aerator reactor (2) from a storage vessel (1) or other source of wastewater to be treated where it is subjected to electrolysis to form a ferric hydroxide suspension. At the start of the electrolysis the pH value of the solution should be about 7.0. Air is flowed through the electrolysis vessel to help oxidize any ferrous hydroxide produced and to speed up the reaction by a mixing effect. The colour of the mixture after the electrolysis is a reddish brown typical of a precipitate of ferric hydroxide. The time and current density for the electrolysis can vary quite widely as desired. Generally, sufficient ferric hydroxide for treatment purposes is obtained in as little as 6 minutes using a current density of about 200 amps per square meter.

When the electrolysis is completed the contents of the electrolysis and aerator reactor (2) are drained completely into a pH control and final aeration vessel (3) where the pH is adjusted with lime to a value suitable for precipitation of the heavy metals present as hydroxides. Other alkaline compounds can be used but lime is the most cost effective. Air is then sparged through the mixture until the typical red-brown colour of the ferric hydroxide suspension is obvious. The pH of the mixture will have settled to a value required to precipitate the group of heavy metals of concern.

The second aeration and pH control step is needed to ensure that no ferrous ions remain. The existence of ferrous ions can seriously interfere with clarification step.

In the recycle option only ferric hydroxide is precipitated because clean water containing no heavy metals or suspended solids is used.

Figure 1:
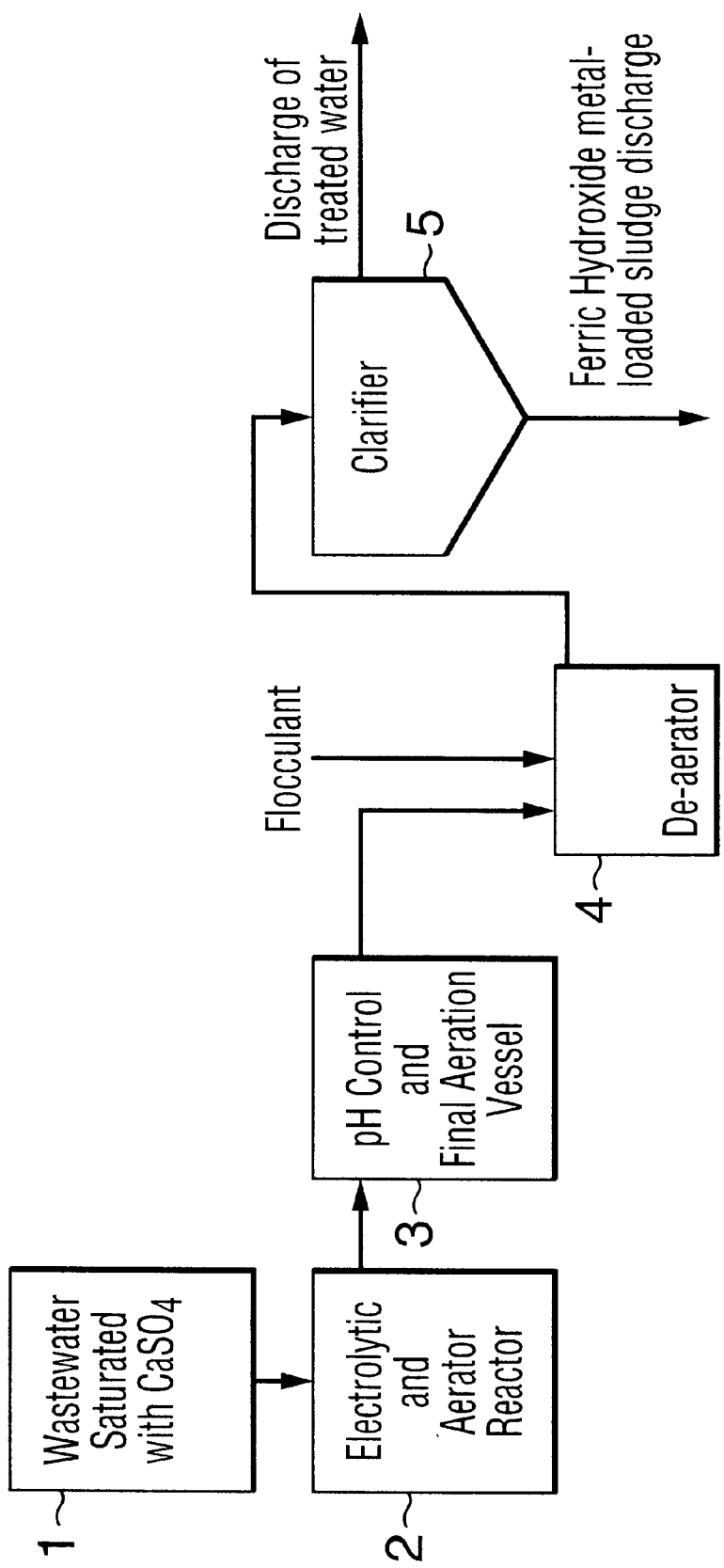
FIG. 1 is a flowchart setting out the steps followed for the process of the present invention.

As shown in FIG. 1, after aeration, the mixture is transferred to a de-aerator tank (4) where a polymer flocculant is added. The mixture is then pumped to a clarifier (5) or settling tank where the ferric hydroxide precipitate settles to the bottom. This ferric hydroxide precipitate is a metal loaded sludge that is finally discharged to a tailings dam or sludge pit. A supernatant liquid (i.e. clean water or treated wastewater) which is still a saturated solution of calcium sulphate is either discharged or used in the recycle option of the present invention.

Figure 3:
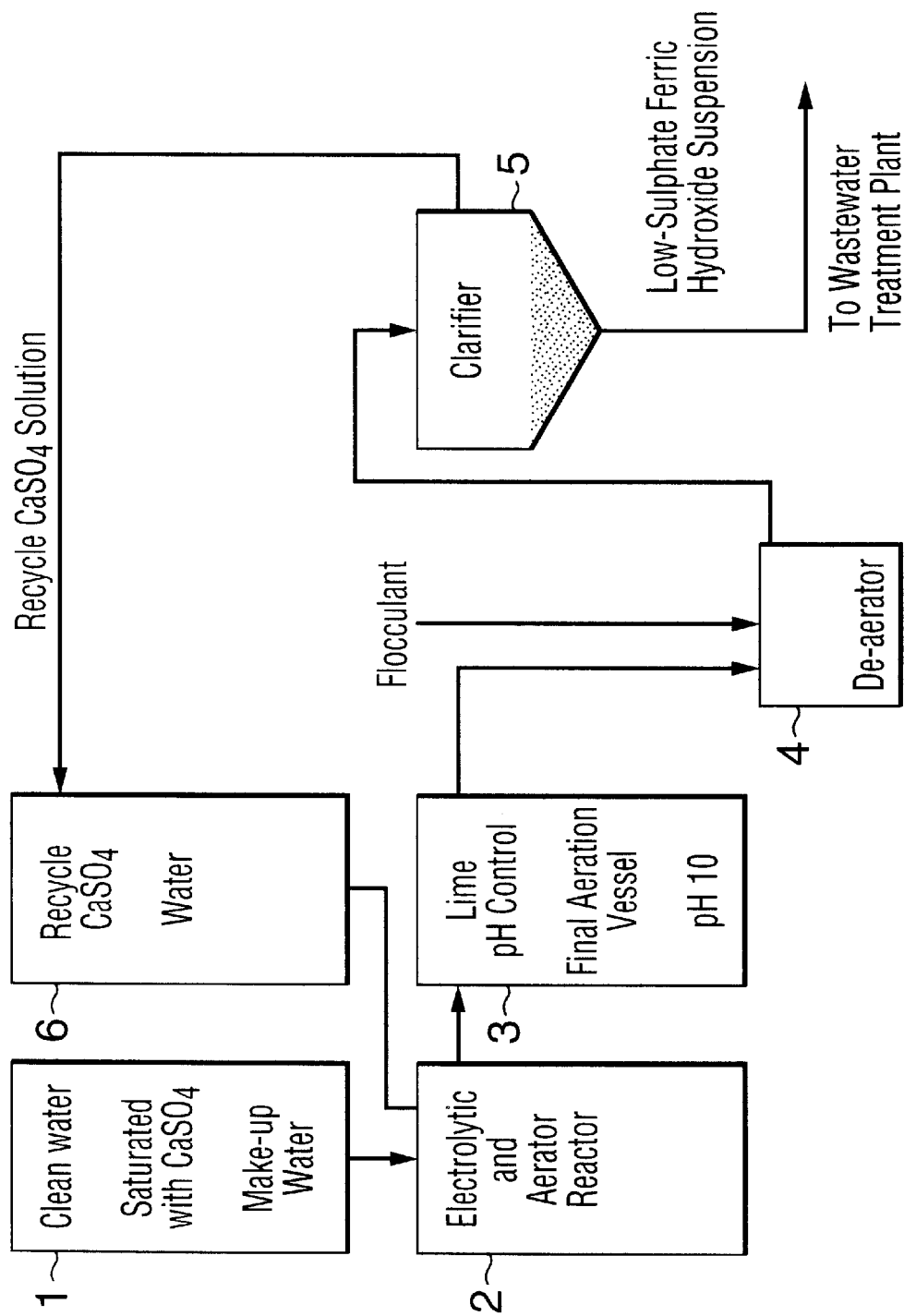
FIG. 3 is a flowchart setting out the steps in the process using the recycle option.

In the recycle option shown in FIG. 3, the supernatant liquid is pumped to a holding tank (6) and can be recycled back to the electrolysis and aerator reactor (2) for a repeat electrolysis. The supernatant liquid is still a solution containing calcium sulphate, approximately 95% of the original content. The ferric hydroxide suspension retains 5% of the original sulphate present. That is, only about 5% of the saturated solution of calcium sulphate is needed to support the ferric hydroxide suspension.

FIG. 3 sets out the process wherein the clean water calcium sulphate solution is recycled for further treatment to provide more ferric hydroxide precipitate (ferric hydroxide suspension). A saturated solution of calcium sulphate in water from a storage vessel (1) enters an electrolysis and aerator reactor (2) where it is subjected to electrolysis under conditions similar to those described above. When the electrolysis and aeration is completed the electrolysis and aerator reactor (2) is drained into a pH control and final aeration vessel (3). The mixture is then transferred to a deaerator tank (4) where a polymer flocculant may be added. The mixture is then pumped to a clarifier (5) where low-sulphate ferric hydroxide suspension settles and the calcium sulphate solution is removed and recycled to a holding tank (6). From the holding tank (6) the calcium sulphate solution is recycled through the electrolysis process to produce more low-sulphate ferric hydroxide.

The ferric hydroxide produced with a small quantity of dissolved sulphates in the suspension water is delivered for use in known wastewater treatment processes. The ferric hydroxide is used to treat wastewaters requiring low sulphate treatment obtained from a variety of processes, for example, mine tailings dams, metal mine pits, etc.

The settled ferric hydroxide is added directly to a wastewater to be treated for removal of dissolved heavy metals such as, copper, nickel, zinc, iron and lead precipitated at high pH values in the range of 9 to 10 and antimony, arsenic and molybdenum precipitated at lower pH values in the range of 6 to 8. Organic or inorganic suspended solids can also be removed with the settled ferric hydroxide. That is, these organic or inorganic suspended solids are co-precipitated or adsorbed with the ferric hydroxide.

The bulk of the dissolved calcium sulphate remains in the supernatant liquid that is recycled for further electrolysis treatment. Each cycle in the recycle process consumes approximately 5% of the saturated calcium sulphate water as suspension support water. This would suggest that all of the original recycle solution of calcium sulphate would be used up after 20 cycles. Make up water, i.e. saturated solution of calcium sulphate from tank 1 in FIG. 3, must be added in an amount of about 5% of the total system volume per cycle to maintain the system operating volume at the same level.

This recycling is key to keeping the sulphate ion concentration to a minimum in the treated wastewater. That is, to keep it at a level of about 100 mg/l $CaSO_4$ above the background level.

Over time the anode electrode is partially consumed by the electrolysis process. At this point, the polarity of the electrolytic cell can be reversed while a new steel anode electrode is fabricated. The cathode electrode does not deteriorate in the normal operation of the process.

Electrolysis using a current density of 200 amps per square meter produces sufficient ferric hydroxide to treat 1 cubic meter of wastewater per square meter of electrode area per hour. A bank of five electrolytic cells with electrodes of 5 square meters in area each can treat 25 cubic meters of water per hour, 600 cubic meters per day.

Figure 2:
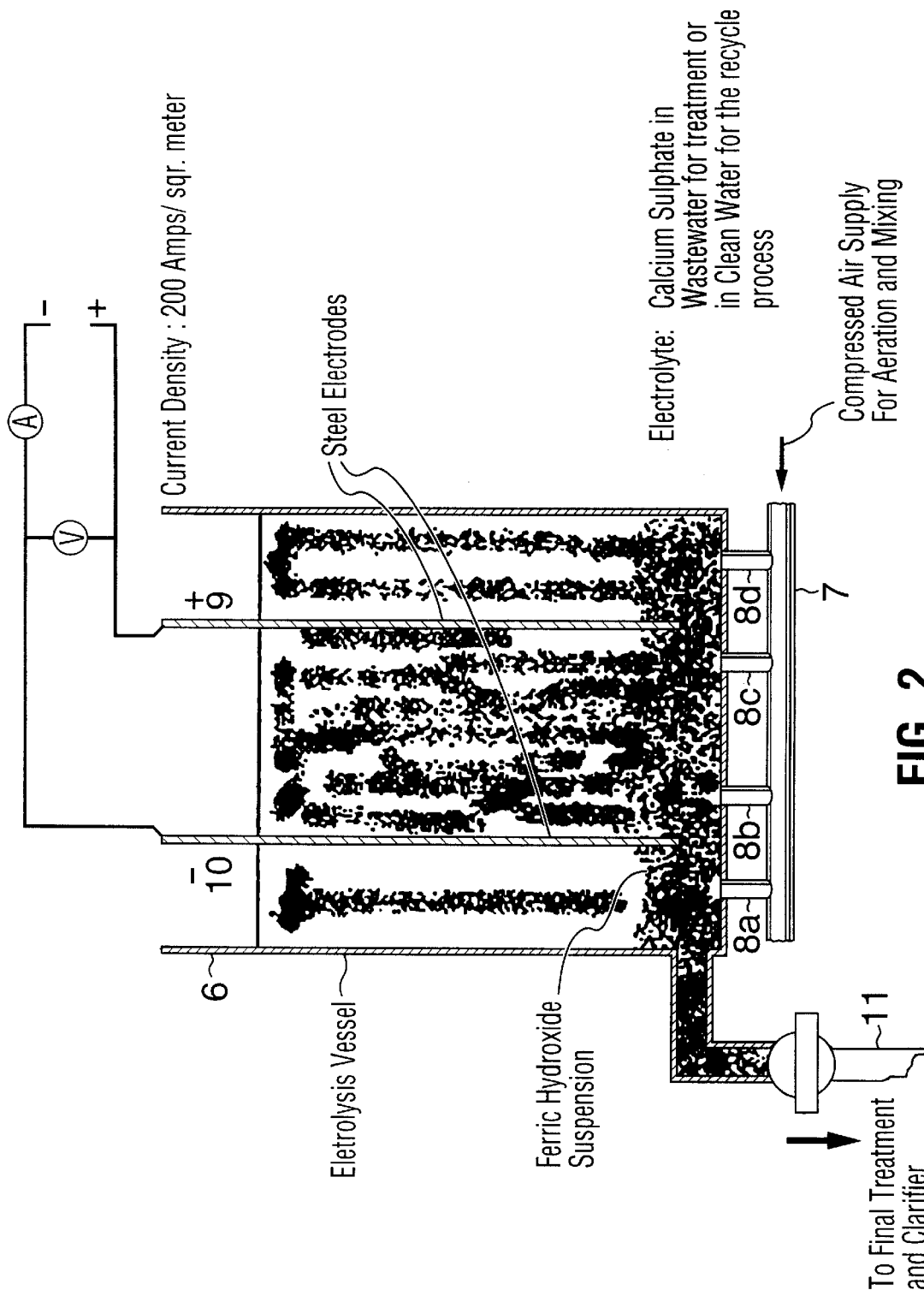
FIG. 2 is a schematic diagram of the electrolysis and aerator reactor used in the process of the present invention.

FIG. 2 sets out a schematic diagram of the electrolysis and aeration reactor (2) used for the process of the present invention. The electrolysis vessel (6) is typical of most electrolysis vessels and should have a volume of 1 cubic meter for each square meter of anode electrode area. Although the size depends on the volume of wastewater to be treated and the flow rate when the process is operated continuously. A compressed air supply (7) with several nozzles (8a, 8b, 8c, 8d) for adding air to the electrolysis vessel (6) is situated along the bottom of the vessel. Steel electrodes, specifically an anode (9) and a cathode (10), are located in the electrolysis vessel (6). The electrolysis vessel (6) also includes a discharge port (11) for transfer of the electrolysed solution to the further treatment steps.

The chemistry of the invention will now be described by way of an example that should not be construed to limit the scope of the invention in any way.

EXPERIMENT TO ESTABLISH THE CHEMISTRY OF THE INVENTION AND FEASIBILITY OF THE RECYCLING STEP

Electrolyses of a Saturated Solution of Plaster of Paris $(CaSO_4)_2 \cdot H_2O$ in Water One primary electrolysis was carried out with 3 recycle electrolyses followed by aeration, settling of the ferric hydroxide suspension and removal of the supernatant liquid for the next electrolysis.

| Mean Values of 4 Tests: | |
| --- | --- |
| pH value of solution before electrolysis | 7.1 |
| Electrolysis period in minutes | 30 |
| pH value on electrolysis completion | 9.8 |
| (green to black suspension of ferrous/ferric hydroxides) | |
| Period of aeration in minutes | 15 |
| pH value of mixture after aeration | 7.0 |
| (red brown suspension of ferric hydroxide) | |

The chemistry of the process of the present invention is set out below.

Under electrolyses the ionized dilute solution of calcium sulphate produces $Ca^{++}$ ions at the cathode and $SO_4^{--}$ ions at the anode.

1) $CaSO_4 \leftrightarrow Ca^{++} + SO_4^{--}$

The $Ca^{++}$ ions are neutralized at the cathode to give calcium metal which immediately reacts with water to form calcium hydroxide and hydrogen gas.

2) $Ca^{++} + 2e \rightarrow Ca^0$

3) $Ca^0 + 2H_2O \rightarrow Ca(OH)_2 + H_2 \uparrow$

Sulphate ions react at the anode to produce sulphuric acid and liberate oxygen.

4) $2SO_4^{--} + 2H_2O \rightarrow 2H_2SO_4 + O_2 \uparrow + 4e$

The sulphuric acid produced at the steel anode dissolves a portion of the electrode iron and forms ferrous sulphate. Hydrogen gas is liberated.

5) $Fe + H_2SO_4 \rightarrow FeSO_4 + H_2 \uparrow$

The calcium hydroxide solution produced at the steel cathode mixes with the ferrous sulphate to give precipitate of ferrous hydroxide and calcium sulphate is regenerated.

6) $FeSO_4 + Ca(OH)_2 \rightarrow Fe(OH)_2 \downarrow + CaSO_4$

The final step is the oxidation of ferrous hydroxide to ferric hydroxide.

7) $Fe(OH)_2 + H_2O \rightarrow Fe(OH)_3 + H^+ + e$

EXPERIMENT TO TEST THE INVENTION WITH A SIMULTANEOUS ELECTROLYSIS AND AERATION STEP

In the previous experiment the ferric hydroxide precipitate produced in 30 minutes of electrolysis proved to be 5 times the quantity typically needed to remove heavy metals from wastewater to be treated (based on concentration ratio of 10:1 iron to heavy metal). Accordingly, the period of electrolysis was reduced to 6 minutes for this experiment.

A reduced electrolysis period to 6 minutes allowed a corresponding reduction in the aeration period from 15 minutes to 3 minutes.

The apparatus was modified so that aeration could take place in the cell simultaneous to the electrolysis.

The red-brown ferric hydroxide was produced immediately with no indication of the green to black ferrous hydroxide suspension produced as an intermediate in the two stage electrolysis and aeration steps of the previous experiment.

| Mean Values of 4 Tests | |
| --- | --- |
| pH value of solution before electrolysis | 7.0 |
| Electrolysis, aeration period in minutes | 6 |
| pH value of mixture after electrolysis and aeration | 7.0 |

Numerous advantages can be obtained from the process of the present invention. The process does not require special storage facilities as the reagents are all mild, non-corrosive and easily obtainable reagents. Excess lime is not needed to neutralize the acid content of the ferric sulphate reagent. The process is less dependent on the supply of required and specialized reagents. Gypsum sludge and the scaling effects of saturated calcium sulphate solutions are avoided. The treated resulting wastewater can be discharged to the environment because of the much lower sulphate ion concentrations. The process is very economical requiring low cost and a small quantity of calcium sulphate.

What is claimed is:

1. A process for treating a saturated aqueous solution of calcium sulphate wastewater which comprises the steps of:
   (1) electrolyzing and aerating the saturated aqueous solution of calcium sulphate wastewater to produce a ferric hydroxide suspension wherein the electrolysis is conducted using an iron-containing anode as a source of ferric iron;
   (2) adding an alkaline compound to the ferric hydroxide suspension to precipitate heavy metals in the wastewater as hydroxides;
   (3) allowing the precipitated hydroxides to settle;
   (4) withdrawing and discarding the precipitated hydroxides; and
   (5) discharging or recycling the treated wastewater.

2. A process according to claim 1 which comprises the further steps of:
   (1) recycling the treated wastewater for electrolysis and aeration to produce a ferric hydroxide suspension wherein the electrolysis is conducted using an iron-containing anode as a source of ferric iron;
   (2) allowing the ferric hydroxide suspension to form and settle;
   (3) withdrawing the ferric hydroxide suspension for use in other wastewater treatment processes; and
   (4) if required, recycling the treated wastewater for further electrolysis.

3. The process according to claim 2 wherein the treated wastewater is a saturated aqueous solution of calcium sulphate.

4. The process according to claim 2 wherein the electrolysis is conducted for a period of time of about 6 minutes.

5. The process according to claim 2 wherein the electrolysis is conducted at a current density of 200 amps per square meter.

6. The process according to claim 2 wherein the ferric hydroxide suspension is a low sulphate ferric hydroxide suspension.

7. The process according to claim 2 which comprises a second aeration step.

8. The process according to claim 1 wherein the alkaline compound is lime.

9. The process according to claim 1 wherein the electrolysis is conducted for a period of time of about 6 minutes.

10. The process according to claim 1 wherein the electrolysis is conducted at a current density of 200 amps per square meter.

11. The process according to claim 1 which comprises a second aeration step.

* * * * *